US012644995B2

(12) United States Patent
Wang et al.

(10) Patent No.: US 12,644,995 B2
(45) Date of Patent: Jun. 2, 2026

(54) ROAD USER RECOGNITION METHOD AND DEVICE, STORAGE MEDIUM, AND ELECTRONIC DEVICE

(71) Applicant: ZTE Corporation, Shenzhen (CN)

(72) Inventors: Shaojiang Wang, Shenzhen (CN); Yazhu Ke, Shenzhen (CN); Bo Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 201 days.

(21) Appl. No.: 18/562,319

(22) PCT Filed: Apr. 28, 2022

(86) PCT No.: PCT/CN2022/089966
§ 371 (c)(1),
(2) Date: Nov. 19, 2023

(87) PCT Pub. No.: WO2022/242447
PCT Pub. Date: Nov. 24, 2022

(65) Prior Publication Data
US 2024/0241270 A1     Jul. 18, 2024

(30) Foreign Application Priority Data

May 19, 2021     (CN) ......................... 202110547082.1

(51) Int. Cl.
*G01S 19/42*          (2010.01)
*G06N 20/00*          (2019.01)
(Continued)

(52) U.S. Cl.
CPC ............. *G01S 19/42* (2013.01); *G06N 20/00* (2019.01); *H04W 4/027* (2013.01); *G06N 5/01* (2023.01); *G06N 20/10* (2019.01)

(58) Field of Classification Search
None
See application file for complete search history.

(56) References Cited

U.S. PATENT DOCUMENTS 9,836,062 B1 * 12/2017 Hayward ............... B60K 35/22
2005/0085239 A1    4/2005 Cedervall
(Continued)

FOREIGN PATENT DOCUMENTS

CN          102264097 A        11/2011
CN          107172637 A         9/2017
(Continued)

OTHER PUBLICATIONS

European Search Report for Application No. 22803771.9, dated Oct. 14, 2024, 8 pages.
(Continued)

*Primary Examiner* — Vladimir Magloire
*Assistant Examiner* — Ashley Brown Raynal
(74) *Attorney, Agent, or Firm* — CANTOR COLBURN LLP

(57) ABSTRACT

A road user recognition method and device, a storage medium, and an electronic device are provided. The method includes: extracting Measurement Report (MR) data within a preset time period; obtaining target MR data carrying an Assisted Global Positioning System (AGPS) measurement result from the MR data; and performing road user recognition based on the target MR data. The method solves the problem in the related art that the recognition of road users based on electronic map information of roads relies on the electronic map information, which increases data costs, storage costs, and maintenance costs, and limits scenarios in which a road user recognition function can be deployed. Road users can be recognized without external electronic map information provided by a third party, which decreases
(Continued)

Extract MR data within a preset time period — S202

Obtain target MR data carrying an AGPS measurement result from the MR data — S204

Perform road user recognition based on the target MR data — S206 data costs as well as storage and maintenance costs, and makes deployment scenarios more flexible.

16 Claims, 5 Drawing Sheets

(51) Int. Cl.
*H04W 4/02* (2018.01)
*G06N 5/01* (2023.01)
*G06N 20/10* (2019.01)

(56) References Cited

U.S. PATENT DOCUMENTS

| | | | | |
|---|---|---|---|---|
| 2010/0057334 | A1* | 3/2010 | Ramaswamy | ... G08G 1/096888 |
| | | | | 701/117 |
| 2012/0214512 | A1 | 8/2012 | Siomina et al. | |
| 2019/0082369 | A1 | 3/2019 | Wu et al. | |
| 2019/0103019 | A1* | 4/2019 | Fowe | .................... G08G 1/015 |
| 2022/0343637 | A1* | 10/2022 | Zhou | ................... G06V 20/588 |

FOREIGN PATENT DOCUMENTS

| | | | |
|---|---|---|---|
| CN | 108377508 | A | 8/2018 |
| CN | 109344729 | A | 2/2019 |
| CN | 111093156 | A | 5/2020 |
| CN | 111314947 | A | 6/2020 |
| CN | 111510859 | A | 8/2020 |
| CN | 112291706 | A | 1/2021 |
| CN | 112445786 | A | 3/2021 |

OTHER PUBLICATIONS

International Search Report for corresponding application PCT/CN2022/089966 filed Apr. 28, 2022; Mail date Jul. 27, 2022.
Chinese Office Action; Application No. 2021105470821; Filing Date: May 19, 2021; date of mailing: Mar. 4, 2026, 5 pages.
Wang, X. "LTE user perception evaluation method based on MR data and machine learning." Mobile Communications 42.8 (2018): 21-26.

* cited by examiner

Fig. 3

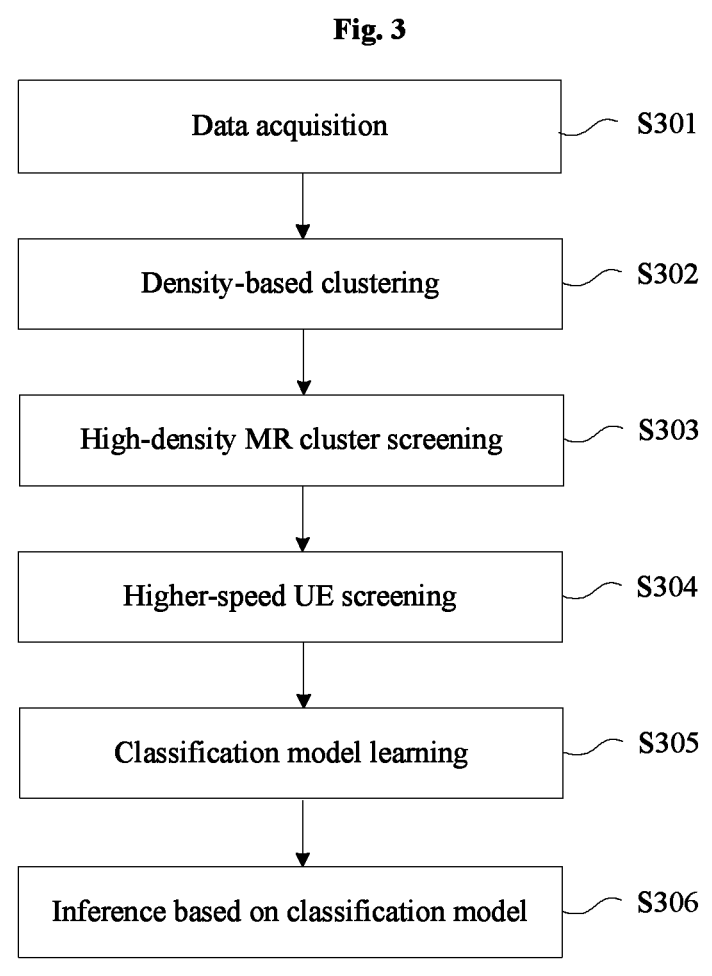

| Data acquisition | ⌐ S301 |

↓

| Density-based clustering | ⌐ S302 |

↓

| High-density MR cluster screening | ⌐ S303 |

↓

| Higher-speed UE screening | ⌐ S304 |

↓

| Classification model learning | ⌐ S305 |

↓

| Inference based on classification model | ⌐ S306 |

Fig. 4

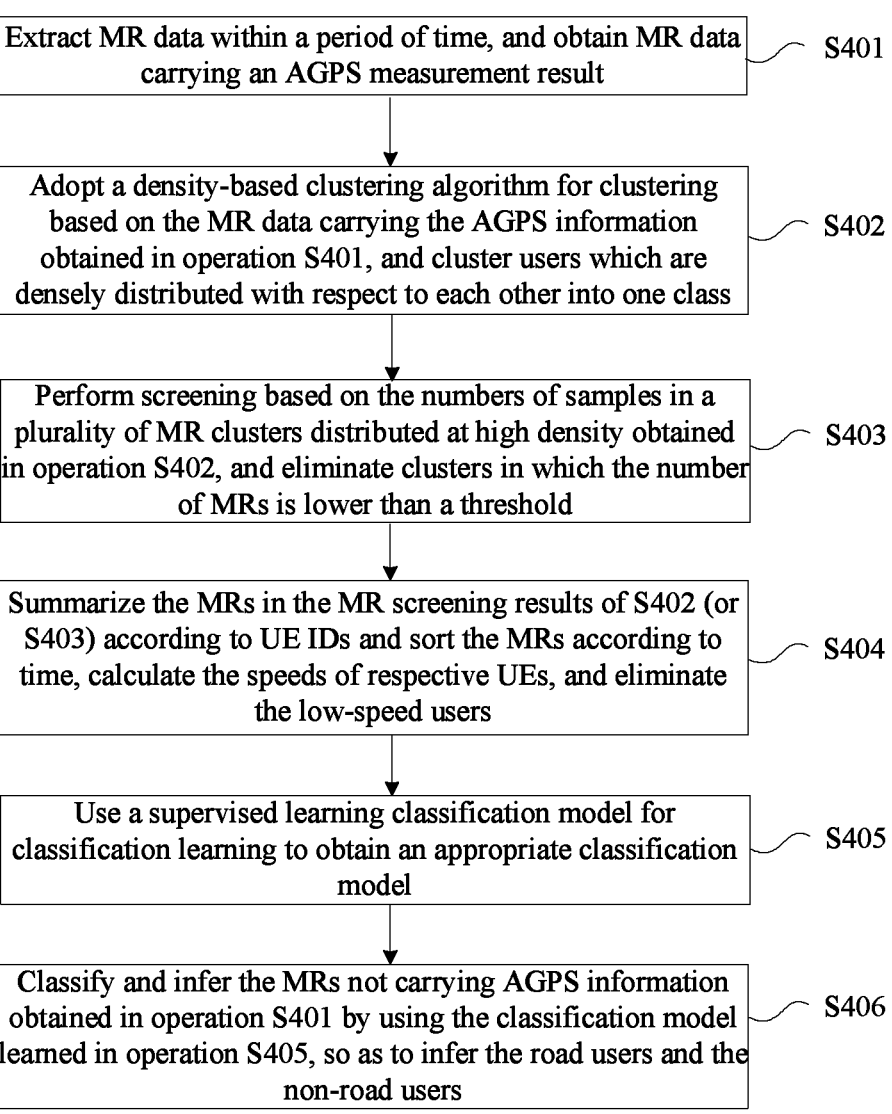

Extract MR data within a period of time, and obtain MR data carrying an AGPS measurement result — S401

Adopt a density-based clustering algorithm for clustering based on the MR data carrying the AGPS information obtained in operation S401, and cluster users which are densely distributed with respect to each other into one class — S402

Perform screening based on the numbers of samples in a plurality of MR clusters distributed at high density obtained in operation S402, and eliminate clusters in which the number of MRs is lower than a threshold — S403

Summarize the MRs in the MR screening results of S402 (or S403) according to UE IDs and sort the MRs according to time, calculate the speeds of respective UEs, and eliminate the low-speed users — S404

Use a supervised learning classification model for classification learning to obtain an appropriate classification model — S405

Classify and infer the MRs not carrying AGPS information obtained in operation S401 by using the classification model learned in operation S405, so as to infer the road users and the non-road users — S406

ROAD USER RECOGNITION METHOD AND DEVICE, STORAGE MEDIUM, AND ELECTRONIC DEVICE

CROSS-REFERENCE TO RELATED APPLICATION

The present disclosure is a National Stage Filing of the PCT International Application No. PCT/CN2022/089966 filed on Apr. 28, 2022, which claims priority to Chinese Patent Application No. CN202110547082.1, filed on May 19, 2021 and entitled "Road User Recognition Method and Device, Storage Medium, and Electronic Device", the disclosure of which is hereby incorporated by reference in its entirety.

TECHNICAL FIELD

Embodiments of the present disclosure relate to the field of communications, and in particular, to a road user recognition method and device, a storage medium, and an electronic device.

BACKGROUND

Traffic models and mobility of users in different usage scenarios have their respective characteristics, and users in specific scenarios may be recognized for specific application scenarios and targeted optimization schemes. Road users are users attracting high attention. The road users will be given priority in various aspects such as virtual road test, user trajectory prediction, mobility optimization, and so on, and therefore it is highly important to correctly recognize these road users. In the conventional art, road user recognition is mainly based on electronic map information of roads. For example, when user positions can be matched with the positions of the roads, that is, when the user positions are close to the positions of the roads, the users are determined as the road users. The method highly relies on complete and accurate electronic map information, and the acquisition of electronic maps will increase costs, including the cost of purchasing the electronic maps, the cost of manual maintenance, and the cost of storing the electronic maps. The large space required for storing large electronic maps will also limit the scenarios in which the road user recognition function can be deployed. For example, the storage space in a base station is precious, and is not suitable for storing electronic map information, thus affecting the deployment of the road user recognition function at the base station.

In view of the problem in the related art that the recognition of road users based on electronic map information of roads relies on the electronic map information, which increases data costs, storage costs, and maintenance costs, and limits scenarios in which a road user recognition function can be deployed, no solution has been proposed.

SUMMARY

The embodiments of the present disclosure provide a road user recognition method and device, a storage medium, and an electronic device, which may at least solve the problem in the related art that the recognition of road users based on electronic map information of roads relies on the electronic map information, which increases data costs, storage costs, and maintenance costs, and limits scenarios in which a road user recognition function can be deployed.

According to the embodiments of the present disclosure, a road user recognition method is provided, which may include the following operations.

Measurement Report (MR) data is extracted within a preset time period.

Target MR data carrying an Assisted Global Positioning System (AGPS) measurement result is obtained from the MR data.

Road user recognition is performed based on the target MR data.

According to another embodiment of the present disclosure, a road user recognition device is further provided, which may include an extraction module, a screening module and a recognition module.

The extraction module is configured to extract MR data within a preset time period.

The screening module is configured to obtain target MR data carrying an AGPS measurement result from the MR data.

The recognition module is configured to perform road user recognition based on the target MR data.

According to still another embodiment of the present disclosure, a computer-readable storage medium is further provided. The storage medium may store a computer program that is executed to perform the operations in any one of the above method embodiments.

According to yet another embodiment of the present disclosure, an electronic device is further provided. The electronic device may include a memory and a processor. The memory may store a computer program. The processor may be configured to execute the computer program to perform the operations in any one of the above method embodiments.

BRIEF DESCRIPTION OF THE DRAWINGS

FIG. 3 is a flowchart of a road user recognition method according to the embodiments of the present disclosure;

FIG. 4 is a flowchart of a road user recognition method according to an exemplary embodiment of the present disclosure;

DETAILED DESCRIPTION

Figure 1:
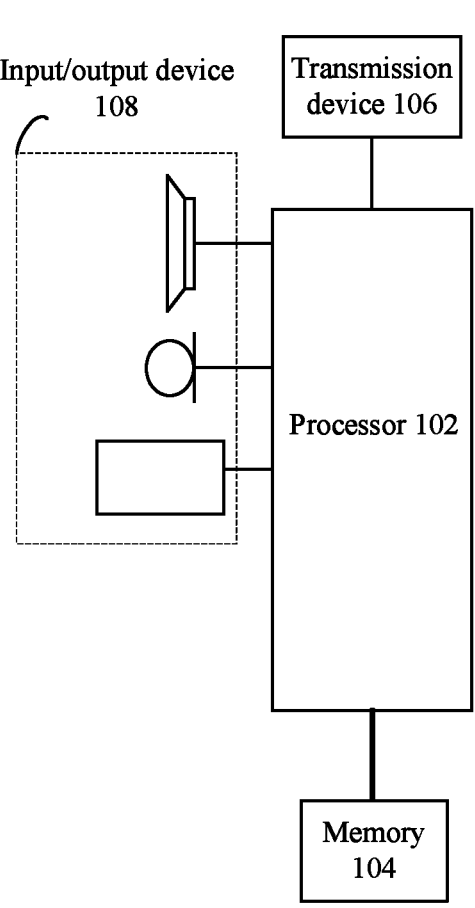
FIG. 1 is a block diagram of a hardware structure of a mobile terminal for implementing a road user recognition method according to the embodiments of the present disclosure.

The embodiments of the present disclosure are described below with reference to the drawings and in conjunction with the embodiments in detail.

It is to be noted that the specification and claims of the disclosure and the terms "first", "second" and the like in the drawings are used to distinguish similar objects, and do not need to describe a specific sequence or a precedence order.

The method embodiments provided in the embodiments of the present disclosure may be executed in a mobile terminal, a computer terminal or a similar computing device. For example, the method embodiments may be executed on a mobile terminal. FIG. 1 is a block diagram of a hardware structure of a mobile terminal for implementing a road user recognition method according to the embodiments of the present disclosure. As shown in FIG. 1, the mobile terminal may include one or more (only one shown in FIG. 1) processor 102 (the processor 102 may include, but is not limited to, a processing device such as a Micro Control Unit (MCU) or a Field Programmable Gate Array (FPGA) and a memory 104 configured to store data. The mobile terminal may further include a transmission device 106 for conducting a communication function and an input output device 108. It will be understood by those having ordinary skill in the art that the structure shown in FIG. 1 is merely illustrative and does not limit the structure of the above mobile terminal. For example, the mobile terminal may further include more or fewer components than shown in FIG. 1, or has a different configuration from that shown in FIG. 1.

The memory 104 may be configured to store a computer program, for example, a software program and modules of application software, such as a computer program corresponding to a road user recognition method in the embodiments of the present disclosure. The processor 102 executes various functional applications and a traffic chain address pool slicing process, that is, implements the above method by executing the computer program stored in the memory 104. The memory 104 may include a high speed Random Access Memory (RAM) and may further include a non-volatile memory such as one or more magnetic storage devices, a flash memory, or other non-volatile solid state memories. In some examples, the memory 104 may further include memories remotely located relative to the processor 102, which may be connected to the mobile terminal over a network. The examples of such networks include, but are not limited to, the Internet, the Intranet, local area networks, mobile communication networks, and combinations thereof.

The transmission device 106 is configured to receive or transmit data via a network. The examples of the above network may include a wireless network provided by a communication provider of the mobile terminal. In one example, the transmission device 106 includes a Network Interface Controller (NIC) that may be connected to other network devices through the base station to communicate with the Internet. In one example, the transmission device 106 may be a Radio Frequency (RF) module for communicating with the Internet wirelessly.

Figure 2:
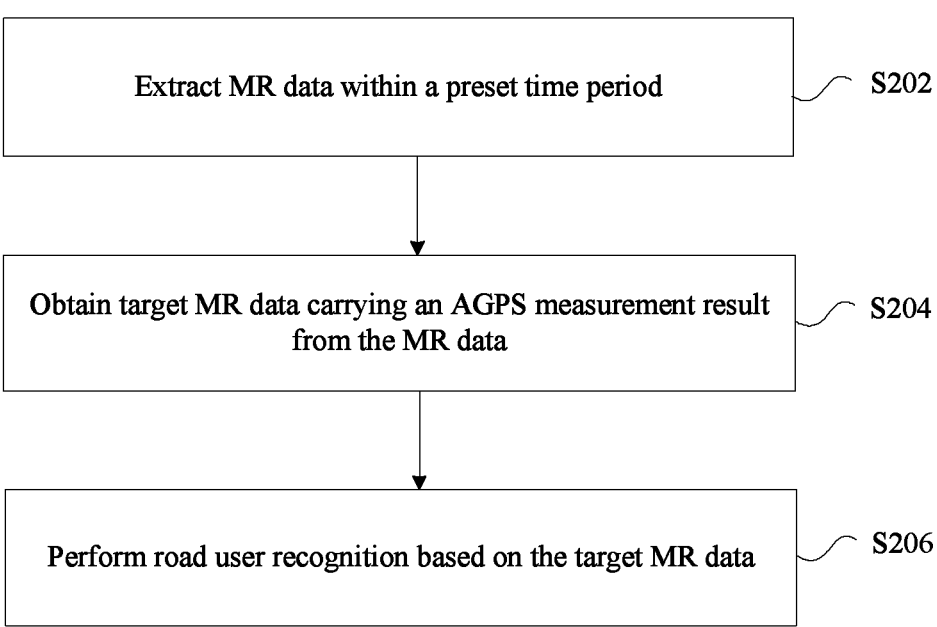
FIG. 2 is a flowchart of a road user recognition method according to the embodiments of the present disclosure.

A road user recognition method executed on the above mobile terminal or network architecture is provided in the embodiments of the present disclosure. The method is applied to a terminal. The terminal may access a current Master Node (MN) cell and a current Secondary Node (SN) cell in a source area through Dual Connection (DC). FIG. 2 is a flowchart of a road user recognition method according to the embodiments of the present disclosure. As shown in FIG. 2, the flow includes the following operations S202 to S206.

In operation S202, MR data within a preset time period is extracted.

In operation S204, target MR data carrying an AGPS measurement result is obtained from the MR data.

In operation S206, road user recognition is performed based on the target MR data.

Through operations S202 to S206, MR data within a preset time period is extracted; target MR data carrying an AGPS measurement result is obtained from the MR data; and road user recognition is performed based on the target MR data. The embodiments of the present disclosure solve the problem in the related art that the recognition of road users based on electronic map information of roads relies on the electronic map information, which increases data costs, storage costs, and maintenance costs, and limits scenarios in which a road user recognition function can be deployed. Road users can be recognized without external electronic map information provided by a third party, which decreases data costs as well as storage and maintenance costs, and makes deployment scenarios more flexible.

In the embodiments of the present disclosure, operation S206 includes the following operations S2061 to S2062.

In operation S2061, the target MR data is clustered based on a density-based clustering algorithm to obtain a plurality of high-density distributed MR clusters.

In operation S2062, users in the plurality of MR clusters are determined as road users, and users corresponding to MR data, other than the plurality of MR clusters, in the target MR data are determined as non-road users.

In an embodiment, in operation S2062, the operation that the users in the plurality of MR clusters are determined as the road users may specifically include the following operations. Each MR cluster in which the number of samples is less than a preset number is eliminated from the plurality of MR clusters to obtain target MR clusters. Users in the target MR clusters are determined as the road users. In some exemplary implementations, the plurality of MR clusters are mapped into geographic grids; each grid in which the number of MR clusters is greater than a preset threshold is determined as a suspected road grid; the suspected road grids with continuous geographic positions are gathered into a target cluster; and users in the target cluster are determined as the road users.

In another embodiment, in operation S2062, the operation that the users in the plurality of MR clusters are determined as the road users may include the following operations. The plurality of MR clusters are summarized according to UE IDs; moving speeds of respective UEs are calculated according to a time sequence, and each moving speed less than a preset speed threshold is eliminated to obtain a plurality of moving speeds; and users corresponding to the plurality of moving speeds are determined as the road users.

In an exemplary embodiment, after the users in the plurality of MR clusters are determined as the road users, and the users corresponding to the MR data, other than the plurality of MR clusters, in the target MR data are determined as the non-road users, training samples for supervised learning are constructed according to the road users and the non-road users, wherein sample features are partial or full wireless channel environment information in the MR data, and sample labels are labels indicating the road users or the non-road users; and classification learning is performed by using a supervised learning classification model according to the training samples to obtain a classification model, wherein the classification model is used for road user recognition based on MR data not carrying the AGPS measurement result.

In another exemplary embodiment, after the classification learning is performed by using the supervised learning classification model according to the training samples to obtain the classification model, the MR data is input into the classification model to obtain a recognition result output by the classification model, wherein the recognition result includes the road users and the non-road users.

In the embodiments of the present disclosure, the classification of the road users and non-road users for all users is realized according to MR information reported by users and by utilizing the features of high density linear distribution formed by a large number of road users turning on a Global Positioning System (GPS) to obtain positioning information and by utilizing the features of high speed of road vehicles, without relying on road electronic map information. Firstly, a density-based clustering algorithm is adopted to obtain high-density distributed MR clusters, and clusters with a small number of MR samples are eliminated. Then, speed is calculated based on the positions in the MR belonging to the same user, users with low speed are screened out according to a threshold so as to extract road users with high confidence, and at the same time, users outside these clusters are determined as non-road users with high confidence. Then, the RF features of the road users and the non-road users with high confidence are further used for supervised classification learning to obtain a classification model based on RF fingerprint features, thereby classifying all users into the road users and non-road users.

The recognition may be completed based on an MR reported by a wireless terminal (a part of users may report high-precision positioning information such as AGPS information). FIG. 3 is a flowchart of a road user recognition method according to the embodiments of the present disclosure. As shown in FIG. 3, the flow includes the following operations S301 to S306.

In operation S301, data acquisition is performed to extract MR data within a period of time, and MRs carrying an AGPS measurement result are obtained.

In operation S302, MRs which are densely distributed with respect to each other are determined as MRs of road users based on density clustering and based on MRs carrying AGPS information, users corresponding to these MRs are suspected road users, and other users are non-road users.

As an exemplary implementation, a density-based clustering algorithm is adopted for clustering, and the clustered MRs correspond to the road users.

The density-based clustering algorithm may adopt a Density-based Spatial Clustering of Applications with Noise (DBSCAN) algorithm. A clustering result is that MRs distributed at high density are clustered as MR clusters that correspond to suspected road users, while other MRs are outside the MR clusters and correspond to non-road users. In the clustering result, there may be a plurality of high-density distributed MR clusters.

As an alternative implementation, the MRs may be mapped to geographic grids for judgment. That is, when the number of MRs in the same grid is greater than a certain threshold, the grid is regarded as a suspected road grid, and geographically continuous suspected road grids are clustered into a cluster, wherein users within the cluster are suspected road users and other users are non-road users.

In operation S303, high-density MR cluster screening is performed. In order to further improve the recognition accuracy of road users, the numbers of samples contained in a plurality of high-density distributed MR clusters obtained in operation S302 are checked to eliminate each cluster in which the number of MRs is lower than a threshold. This operation is performed based on the consideration that road users present linear continuous high-density distribution, and therefore, there are supposed to be many MRs in the cluster, and users presenting individual dotted aggregation distribution are not road users in most cases.

In operation S304, higher-speed UE screening is performed. In order to further improve the recognition accuracy of road users, the MRs in the MR screening results of S302 (or S303) are summarized according to UE IDs and sorted according to time, the speeds of respective UEs are calculated, and the low-speed users are eliminated. The operation is performed based on the fact that the speed of motor vehicles on the road is usually more than a certain speed.

When the speed reaches the above threshold, the probability that these users are road uses is higher.

In operation S305, a classification model is learned. Training samples for supervised learning are constructed by using the road users and the non-road users already recognized, wherein sample features are partial or full wireless channel environment information in the MR data, and sample labels are labels indicating the road users or the non-road users. The supervised learning classification model is used for classification learning, so as to obtain an appropriate classification model by learning.

The wireless channel environment information in the MR includes, but is not limited to, Reference Signal Receiving Power (RSRP), Reference Signal Receiving Quality (RSRQ), a Signal to Interference plus Noise Ratio (SINR), Time Advance (TA), and Direct of Arrive (DoA) of a serving cell, and RSRP, RSRQ, SINR information, and the like of a neighboring cell.

The supervised learning classification model in the embodiments of the present disclosure may adopt various classification models such as a Support Vector Machine (SVM) and a random forest.

In operation S306, the MRs not carrying AGPS information are classified by using the classification model learned in operation S305 based on the inference of the classification model, so as to infer the road users and the non-road users.

FIG. 4 is a flowchart of a road user recognition method according to an exemplary embodiment of the present disclosure. As shown in FIG. 4, the flow specifically includes the following operations S401 to S406.

In operation S401, MR data within a period of time is extracted, and MRs carrying an AGPS measurement result are obtained.

In operation S402, users which are densely distributed with respect to each other are clustered into one cluster by adopting a density-based clustering algorithm for clustering and based on the MRs carrying the AGPS information obtained in operation S401. The density-based clustering algorithm may adopt a DBSCAN algorithm. The clustering parameters for the DBSCAN algorithm may be set as follows: a clustering radius eps is set according to a road width, for example, eps may be set to be equal to 10 m, and a minimum number of the samples min_samples may be set to be equal to 50. A clustering result is that MRs distributed at high density are clustered as MR clusters that correspond to suspected road users, while other MRs are outside the MR clusters and correspond to non-road users. In the clustering result, there may be a plurality of high-density distributed MR clusters.

In operation S402, the operation of determining the MRs distributed at high density based on the MRs carrying the AGPS information obtained in operation S401 may specifically include: geographic grids having a grid width determined according to a road width (for example, the grid width is 10 m) are constructed, the MRs are mapped to the grid, the number of MRs in each grid is counted, and each grid with the number of MRs greater than a certain threshold (for example, 50) is determined as a suspected road grid. Further, the suspected road grids with continuous geographic positions are placed into one cluster. A plurality of road user MR clusters may be formed. Users in the road user MR clusters are suspected road users, while users outside the road user MR clusters are non-road users.

In operation S403, in order to further improve the recognition accuracy of road users, the numbers of samples in a plurality of high-density distributed MR clusters obtained in operation S402 are checked to eliminate each cluster in which the number of MRs is lower than a threshold. This operation is performed based on the consideration that road users present linear continuous high-density distribution, and therefore, there are supposed to be many MRs in the cluster, and users presenting individual dotted aggregation distribution are not road users in most cases.

In operation S404, in order to further improve the recognition accuracy of road users, the MRs in the MR screening results of S402 (or S403) are summarized according to UE IDs and sorted according to time, the speeds of respective UEs are calculated, and the low-speed users are eliminated. The operation is performed based on the fact that the speed of motor vehicles on the road is usually more than a certain speed. When the speed reaches the above threshold, the probability that these users are road uses is higher.

The speed may be calculated as follows. Firstly, a distance d between positions contained in MRs, adjacent in the time domain, of the same UE is calculated to obtain a total moving distance $$D = \sum_0^I d(i)$$

of the UE, and a total time T=t(1)−t(0) is calculated. The moving speed of the UE is then obtained by V=D/T.

In operation S405, a supervised learning classification model is used for classification learning, so as to determine an appropriate classification model by learning. Training samples for supervised learning are constructed by using the road users and the non-road users already recognized, wherein sample features are partial or full wireless channel environment information in the MR data, and sample labels are labels indicating the road users or the non-road users.

Further, in order to improve the generalization ability of the model and improve the prediction accuracy, it is necessary to extract the training samples in a balanced way when constructing the training samples, that is, to balance the number of road users and non-road users (the number is kept within a certain level, such as extracting samples at a ratio of 1:1).

In operation S406, the MRs not carrying AGPS information obtained in operation S401 are classified and inferred by using the classification model learned in operation S405, so as to infer the road users and the non-road users.

Figure 5:
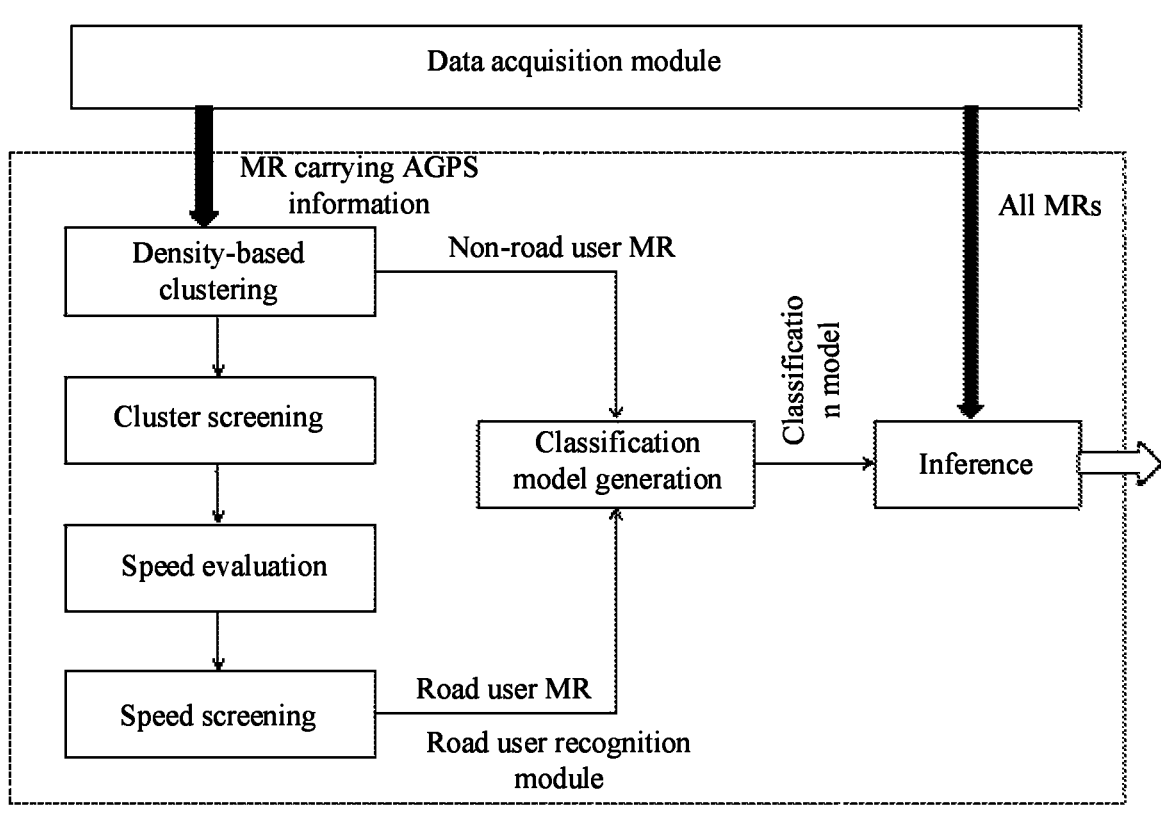
FIG. 5 is a schematic diagram of road user recognition according to the embodiments of the present disclosure.

FIG. 5 is a schematic diagram of road user recognition according to the embodiments of the present disclosure, as shown in FIG. 5, the road user recognition include a data acquisition module and a road user recognition module.

The data acquisition module is configured to collect MR data.

The road user recognition module is configured to complete the following functions:

density-based clustering, in which high-density distributed MRs are obtained by using a density-based clustering algorithm;

cluster screening, in which MR clusters with fewer MRs are eliminated;

speed evaluation, which evaluates the speed according to the position information of MRs of the same UE;

speed screening, by which more reliable road users are kept;

classification model generation, in which learning samples are constructed based on the determined road users and non-road users, and a classification model is learned by using a classification learning algorithm; and inference, which classifies all users based on the classification model.

Figure 6:
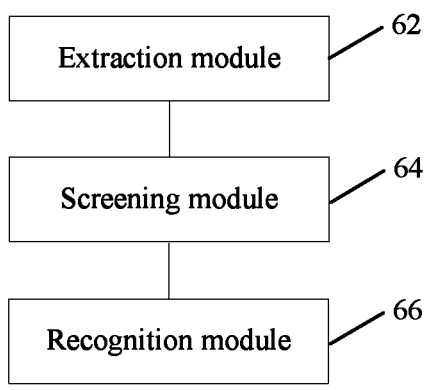
FIG. 6 is a block diagram of a road user recognition device according to the embodiments of the present disclosure.

According to the embodiments of the present disclosure, a road user recognition device is further provided. FIG. 6 is a block diagram of a road user recognition device according to the embodiments of the present disclosure. As shown in FIG. 6, the device includes an extraction module 62, a screening module 64 and a recognition module 66.

The extraction module 62 is configured to extract MR data within a preset time period.

The screening module 64 is configured to obtain target MR data carrying an AGPS measurement result from the MR data.

The recognition module 66 is configured to perform road user recognition based on the target MR data.

In an exemplary embodiment, the recognition module 66 includes a clustering submodule and a determination submodule.

The clustering submodule is configured to cluster the target MR data based on a density-based clustering algorithm to obtain a plurality of high-density distributed MR clusters.

The determination submodule is configured to determine users in the plurality of MR clusters as road users, and determine users corresponding to MR data, other than the plurality of MR clusters, in the target MR data as non-road users.

In an exemplary embodiment, the determination submodule includes a first elimination unit and a first determination unit.

The first elimination unit is configured to eliminate, from the plurality of MR clusters, each MR cluster in which the number of samples is less than a preset number to obtain target MR clusters.

The first determination unit is configured to determine users in the target MR clusters as the road users.

In an exemplary embodiment, the determination unit is further configured to:

map the plurality of MR clusters into geographic grids;

determine each grid in which the number of MR clusters is greater than a preset threshold as a suspected road grid;

gather the suspected road grids with continuous geographic positions into a target cluster; and determine users in the target cluster as the road users.

In an exemplary embodiment, the determination submodule includes a summarization unit, a second elimination unit and a second determination unit.

The summarization unit is configured to summarize the plurality of MR clusters according to UE IDs.

The second elimination unit is configured to calculate moving speeds of respective UEs according to a time sequence, and eliminate each moving speed less than a preset speed threshold to obtain a plurality of moving speeds.

The second determination unit is configured to determine users corresponding to the plurality of moving speeds as the road users.

In an exemplary embodiment, the device further includes a construction module and a classification learning module.

The construction module is configured to construct training samples for supervised learning according to the road users and the non-road users, wherein sample features are partial or full wireless channel environment information in the MR data, and sample labels are labels indicating the road users or the non-road users.

The classification learning module is configured to perform classification learning by using a supervised learning classification model according to the training samples to obtain a classification model, wherein the classification model is used for road user recognition based on MR data not carrying the AGPS measurement result.

In an exemplary embodiment, the device further includes an input module.

The input module is configured to input the MR data into the classification model to obtain a recognition result output by the classification model, wherein the recognition result includes the road users and the non-road users.

The embodiments of the present disclosure further provide a computer-readable storage medium. The computer-readable storage medium stores a computer program. The computer program is executed to perform the operations in any one of the above method embodiments.

In an exemplary embodiment, the computer-readable storage medium may include, but is not limited to, various media capable of storing a computer program such as a U disk, a Read-Only Memory (ROM), a RAM, a mobile hard disk, a magnetic disk or an optical disc.

The embodiments of the present disclosure further provide an electronic device. The electronic device includes a memory and a processor. The memory stores a computer program. The processor is configured to execute the computer program to perform the operations in any one of the above method embodiments.

In an exemplary embodiment, the electronic device may further include a transmission device and an input output device. The transmission device is connected to the processor, and the input output device is connected to the processor.

A specific example in the embodiments of the present disclosure may refer to the examples described in the above embodiments and exemplary implementations, and details are not described herein in the present embodiment.

Apparently, a person skilled in the art shall understand that all of the above modules or operations in the present disclosure may be implemented by using a general computing device, may be centralized on a single computing device or may be distributed on a network composed of a plurality of computing devices. The modules or operations may be implemented by using executable program codes of the computing device. Therefore, the modules or operations may be stored in a storage device and executed by the computing device, the shown or described operations may be executed in a sequence different from this sequence under certain conditions, or are manufactured into each integrated circuit module respectively, or a plurality of modules or operations therein are manufactured into a single integrated circuit module. Therefore, the present disclosure is not limited to the combination of any specific hardware and software.

The above is only the preferred embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A road user recognition method, comprising:

extracting Measurement Report (MR) data within a preset time period;

obtaining target MR data carrying an Assisted Global Positioning System (AGPS) measurement result from the MR data;

performing road user recognition based on the target MR data, wherein the performing road user recognition based on the target MR data comprises: clustering the target MR data based on a density-based clustering algorithm to obtain a plurality of high-density distributed MR clusters; and determining users in the plurality of MR clusters as road users, and determining users corresponding to MR data, other than the plurality of MR clusters, in the target MR data as non-road users;

constructing training samples for supervised learning according to the road users and the non-road users, wherein sample features are partial or full wireless channel environment information in the MR data, and sample labels are labels indicating the road users or the non-road users; and performing classification learning by using a supervised learning classification model according to the training samples to obtain a classification model, wherein the classification model is used for road user recognition based on MR data not carrying the AGPS measurement result.

2. The method according to claim 1, wherein determining the users in the plurality of MR clusters as the road users comprises:

eliminating, from the plurality of MR clusters, each MR cluster in which the number of samples is less than a preset number to obtain target MR clusters; and determining users in the target MR clusters as the road users.

3. The method according to claim 2, wherein determining the users in the target MR clusters as the road users comprises:

mapping the plurality of MR clusters into geographic grids;

determining each grid in which the number of MR clusters is greater than a preset threshold as a suspected road grid;

gathering the suspected road grids with continuous geographic positions into a target cluster; and determining users in the target cluster as the road users.

4. The method according to claim 3, wherein the geographic grids have a grid width determined according to a road width.

5. The method according to claim 1, wherein determining the users in the plurality of MR clusters as the road users comprises:

summarizing the plurality of MR clusters according to User Equipment Identities (UE IDs);

calculating moving speeds of respective UEs according to a time sequence, and eliminating each moving speed less than a preset speed threshold to obtain a plurality of moving speeds; and determining users corresponding to the plurality of moving speeds as the road users.

6. The method according to claim 5, wherein calculating the moving speeds of the respective UEs comprises:

calculating a distance d between positions contained in MRs, adjacent in a time domain, of a same UE to obtain a total moving distance D of the UE;

calculating a total time T; and obtaining the moving speed V of the UE by V=D/T.

7. The method according to claim 1, wherein after performing the classification learning by using the supervised learning classification model according to the training samples to obtain the classification model, the method further comprises:

inputting the MR data into the classification model to obtain a recognition result output by the classification model, wherein the recognition result comprises the road users and the non-road users.

8. The method according to claim 1, wherein the density-based clustering algorithm is a Density-based Spatial Clustering of Applications with Noise (DBSCAN) algorithm.

9. The method according to claim 1, wherein the wireless channel environment information in the MR data comprises at least one of the following: a Reference Signal Receiving Power (RSRP), a Reference Signal Receiving Quality (RSRQ), a Signal to Interference plus Noise Ratio (SINR), a Time Advance (TA), or a Direct of Arrive (DoA) of a serving cell.

10. The method according to claim 9, wherein the wireless channel environment information in the MR data further comprises at least one of the following: an RSRP, an RSRQ, or SINR information of a neighboring cell.

11. A non-transitory computer-readable storage medium, storing a computer program, wherein the computer program, when executed by a processor, causes to processor to execute the following operations:

extracting Measurement Report (MR) data within a preset time period;

obtaining target MR data carrying an Assisted Global Positioning System (AGPS) measurement result from the MR data;

performing road user recognition based on the target MR data, wherein the performing road user recognition based on the target MR data comprises: clustering the target MR data based on a density-based clustering algorithm to obtain a plurality of high-density distributed MR clusters; and determining users in the plurality of MR clusters as road users, and determining users corresponding to MR data, other than the plurality of MR clusters, in the target MR data as non-road users;

constructing training samples for supervised learning according to the road users and the non-road users, wherein sample features are partial or full wireless channel environment information in the MR data, and sample labels are labels indicating the road users or the non-road users; and performing classification learning by using a supervised learning classification model according to the training samples to obtain a classification model, wherein the classification model is used for road user recognition based on MR data not carrying the AGPS measurement result.

12. An electronic device, comprising a memory and a processor, the memory storing a computer program, wherein the processor is configured to execute the computer program to execute the following operations:

extracting Measurement Report (MR) data within a preset time period;

obtaining target MR data carrying an Assisted Global Positioning System (AGPS) measurement result from the MR data;

performing road user recognition based on the target MR data, wherein the performing road user recognition based on the target MR data comprises: clustering the target MR data based on a density-based clustering algorithm to obtain a plurality of high-density distributed MR clusters; and determining users in the plurality of MR clusters as road users, and determining users corresponding to MR data, other than the plurality of MR clusters, in the target MR data as non-road users;

constructing training samples for supervised learning according to the road users and the non-road users, wherein sample features are partial or full wireless channel environment information in the MR data, and sample labels are labels indicating the road users or the non-road users; and performing classification learning by using a supervised learning classification model according to the training samples to obtain a classification model, wherein the classification model is used for road user recognition based on MR data not carrying the AGPS measurement result.

13. The electronic device according to claim 12, wherein determining the users in the plurality of MR clusters as the road users comprises:

eliminating, from the plurality of MR clusters, each MR cluster in which the number of samples is less than a preset number to obtain target MR clusters; and determining users in the target MR clusters as the road users.

14. The electronic device according to claim 13, wherein determining the users in the target MR clusters as the road users comprises:

mapping the plurality of MR clusters into geographic grids;

determining each grid in which the number of MR clusters is greater than a preset threshold as a suspected road grid;

gathering the suspected road grids with continuous geographic positions into a target cluster; and determining users in the target cluster as the road users.

15. The electronic device according to claim 12, wherein determining the users in the plurality of MR clusters as the road users comprises:

summarizing the plurality of MR clusters according to User Equipment Identities (UE IDs);

calculating moving speeds of respective UEs according to a time sequence, and eliminating each moving speed less than a preset speed threshold to obtain a plurality of moving speeds; and determining users corresponding to the plurality of moving speeds as the road users.

16. The electronic device according to claim 12, wherein the processor is configured to execute the computer program to further execute the following operations after performing the classification learning by using the supervised learning classification model according to the training samples to obtain the classification model:

inputting the MR data into the classification model to obtain a recognition result output by the classification model, wherein the recognition result comprises the road users and the non-road users.

* * * * *